(12) United States Patent
Dietrich

(10) Patent No.: US 7,570,644 B2
(45) Date of Patent: Aug. 4, 2009

(54) ROUTING METHOD FOR A TELECOMMUNICATIONS NETWORK AND ROUTER FOR IMPLEMENTING SAID METHOD

(75) Inventor: Matthias Dietrich, La Tronche (FR)

(73) Assignee: STMicroelectronics S.A., Montrouge (FR)

( * ) Notice: Subject to any disclaimer, the term of this patent is extended or adjusted under 35 U.S.C. 154(b) by 924 days.

(21) Appl. No.: 10/417,629

(22) Filed: Apr. 16, 2003

(65) Prior Publication Data

US 2003/0193956 A1  Oct. 16, 2003

(30) Foreign Application Priority Data

Apr. 16, 2002  (FR)  .................................. 02 04739

(51) Int. Cl.
*H04L 12/28* (2006.01)

(52) U.S. Cl. ............. 370/392; 370/395.31; 370/395.54; 370/401

(58) Field of Classification Search ................. 370/389, 370/395.31, 395.32, 395.54
See application file for complete search history.

(56) References Cited

U.S. PATENT DOCUMENTS

| | | | | |
|---|---|---|---|---|
| 5,916,306 A | * | 6/1999 | Ruiz | 709/242 |
| 6,011,795 A | * | 1/2000 | Varghese et al. | 370/392 |
| 6,018,524 A | * | 1/2000 | Turner et al. | 370/392 |
| 6,052,683 A | * | 4/2000 | Irwin | 707/8 |
| 6,061,701 A | | 5/2000 | Hirai et al. | 709/202 |
| 6,067,574 A | * | 5/2000 | Tzeng | 709/247 |
| 6,141,738 A | * | 10/2000 | Munter et al. | 711/206 |
| 6,178,414 B1 | * | 1/2001 | Beckmann et al. | 707/3 |
| 6,253,317 B1 | * | 6/2001 | Knapp, III et al. | 712/244 |
| 6,266,706 B1 | * | 7/2001 | Brodnik et al. | 709/242 |
| 6,385,649 B1 | * | 5/2002 | Draves et al. | 709/224 |
| 6,421,342 B1 | * | 7/2002 | Schwartz et al. | 370/392 |
| 6,611,832 B1 | * | 8/2003 | van Lunteren | 707/3 |

(Continued)

FOREIGN PATENT DOCUMENTS

EP  1 045 556 A2  10/2000

(Continued)

OTHER PUBLICATIONS

Crescenzi et al., "IP Address Lookup Made Fast and Simple," Technical Report TR-99-01, pp. 1-10, 1999.

*Primary Examiner*—Chi H. Pham
*Assistant Examiner*—Shick Hom
(74) *Attorney, Agent, or Firm*—Lisa K. Jorgenson; Robert Iannucci; Seed IP Law Group PLLC

(57) ABSTRACT

A method routes an information packet towards an output port of a telecommunication router comprising N output ports, the router receiving incoming packets comprising a destination address defined by four address elements. The method successively comprises: looking up a first-level table from the first address element of the information packet; looking up a second-level table from the first and second address elements of the packet; searching, with linear or dichotomizing search, a third-level table allowing a third level of search, from the third address element of the packet; searching, with linear or dichotomizing search, a fourth-level table from the fourth address element of the packet. In this way the size of the routing table can be reduced, while still allowing fast processing of incoming packets. Also provided is a router allowing easy integration in a VLSI circuit.

24 Claims, 5 Drawing Sheets

U.S. PATENT DOCUMENTS

| | | | |
|---|---|---|---|
| 6,658,481 B1 * | 12/2003 | Basso et al. | 709/243 |
| 6,778,530 B1 * | 8/2004 | Greene | 370/389 |
| 6,778,539 B1 * | 8/2004 | Rygh | 370/401 |
| 6,956,858 B2 * | 10/2005 | Hariguchi et al. | 370/395.31 |
| 6,975,631 B1 * | 12/2005 | Kastenholz | 370/401 |
| 7,007,101 B1 * | 2/2006 | Schwaderer | 709/238 |
| 7,042,884 B2 * | 5/2006 | Huang et al. | 370/395.54 |
| 7,047,317 B1 * | 5/2006 | Huie et al. | 709/245 |
| 7,145,911 B2 * | 12/2006 | Gooch | 370/395.32 |
| 7,180,887 B1 * | 2/2007 | Schwaderer et al. | 370/351 |
| 2001/0050914 A1 * | 12/2001 | Akahane et al. | 370/382 |
| 2002/0080798 A1 * | 6/2002 | Hariguchi et al. | 370/395.31 |
| 2002/0172203 A1 * | 11/2002 | Ji et al. | 370/392 |

FOREIGN PATENT DOCUMENTS

| | | |
|---|---|---|
| EP | 1 164 752 A1 | 12/2001 |
| GB | 2 350 534 A | 11/2000 |
| JP | 2002759 | 1/1990 |
| WO | WO 99/13620 | 3/1999 |
| WO | WO 99/66681 | 12/1999 |
| WO | WO 02/15521 A1 | 2/2002 |

* cited by examiner

| Valid | Index NH | Index Level 2 |
|---|---|---|

*FIG. 2A*

| Valid | Combination | Index | Index2 | count_level_3 |
|---|---|---|---|---|

*FIG. 2B*

| Valid | Combination | Index | Index2 |
|---|---|---|---|

*FIG. 2C*

| COMB | Nb | Index_Mask | Index nh |
|---|---|---|---|

*FIG. 2D*

ROUTING METHOD FOR A TELECOMMUNICATIONS NETWORK AND ROUTER FOR IMPLEMENTING SAID METHOD

BACKGROUND OF THE INVENTION

1. Field of the invention

The present invention relates to the field of telecommunications and more particularly to a routing method for a router in a telecommunications network.

2. Description of the Related Art

In the last few years, telecommunications networks have considerably developed, in particular with the rise of the Internet network and the growth of companies' private networks (also known as "intranets"). Thus, any user can communicate with any other operator of the network—correspondent or server—, in order to exchange information or to access resources available on the network. Regarding the Internet network's architecture, the basic element thereof is the router that is in charge of the transit of information packets for routing same to their respective recipients.

FIG. 1 illustrates a typical network topography diagram in which three networks or intranets—respectively 1, 2 and 3—are connected to a set of routers 10, 20, 30, 40 and 50 through links. More particularly, router 10 has a first port connected to a link 11 enabling communication with intranet 1, a second port connected to a link 12 for accessing router 20 and, for instance, a third port enabling communication with router 30 via a link 13.

In the Ipv4 version of the Internet network, the destination address of each packet is four bytes (i.e., 32 bits) long and said address is used within each router in order to enable transit of the IP packet that is input through one of the ports of said router—for example port 11 of router 10 for an information packet coming from intranet 1—towards one of the other ports of said router, in order to route it to its recipient, for example a particular correspondent of intranet 2. Practically, the routing of a packet towards the router's correct port is ensured by means of a routing table locally implemented within the router, and allowing, whenever a given packet comes in with an IP address characterizing a recipient, to decode said address, in order to determine the particular port towards which the packet must be redirected among the router's set of available ports. When the table does not contain any specific information related to the routing of a given packet, said packet is then automatically directed towards a default port that is typically arranged for routing of said packet towards a router that will have more information allowing to correctly route said packet.

In modern networks, it is current for routers' routing tables to contain several tens of thousands of inputs that network administrators try to maintain and update in order to ensure an optimal operation of networks. In the case, for example, of a router having approximately 60,000 inputs, with ten bytes (4 bytes for the address, 4 bytes for the network mask and at least 1 byte for the port) associated with each input, the corresponding routing table will necessarily have approximately 600 Kbytes. The problem is that if this table is stored with no particular precaution, the whole table must be entirely looked-up for each incoming packet. Even with the most sophisticated machines—allowing to read 64 bits in a single operation—at least two reading operations are required to read an input. For 60,000 inputs, an average of several thousands of reading operations for a given packet are thus necessary, going up to 120,000 operations in the worst case, which considerably increases packet transit time in the router.

A known technique, described in <<IP address lookup made fast and simple>> by Pierluigi Crescenzi, Leandro Dardini and Roberto Grossi, Università di Pisa, Dipartimento di Informatica, Technical Report TR-99-01, makes it possible to reduce the reading of the table to three operations, however at the cost of a considerable increase in size of this table, which can then reach several megabytes. Such a table—realized with RAM in order to minimize access times to information stored therein—is expensive to implement. Moreover, such a large sized RAM is out of proportion with the possibilities of the semiconductor manufacturing technology, which definitively precludes its integration into a semiconductor circuit. It should further be observed that, in the known system, complete overhauling of the table is required when table updating is to be made, which obviously does not facilitate maintenance of the system.

Another known technique is described in U.S. Pat. No. 6,266,706. It makes it possible to reduce the size of the table to a few hundreds kilobytes and to limit the number of reading operations to six. However, maintenance of this table is particularly delicate owing to the fact that it is necessary to completely rebuild same whenever it is updated.

One is thus confronted with the following dilemma: either accepting to deal with a large routing table—which, currently, cannot be integrated in a semiconductor circuit—or considerably lengthening packet routing time.

BRIEF SUMMARY OF THE INVENTION

The technical problem to be solved by an embodiment of the present application is to provide an optimized organization of a routing table of particularly reduced size—which table can be integrated into a semiconductor circuit—while nevertheless providing an effective and quickly implemented routing method.

It would be further desirable in an embodiment that the organization of the routing table would facilitate maintenance thereof and would allow easy updating of inputs.

An embodiment of the present invention provides a routing method in a telecommunications network controlled by a reduced size routing table allowing easy integration thereof into a semiconductor product.

Another embodiment of the present invention realizes a routing table and a telecommunications network router that allow effective and high speed routing of packets within said router.

Still another embodiment of the present invention provides an easy to maintain organization for a routing table.

Embodiments of the invention provide these features via a method for routing an information packet towards one of the ports of a multiple port telecommunication router, said router receiving incoming packets that include a destination address defined by at least a first, a second, a third and a fourth address element, said method including:

looking up a first-level table from said first address element of said packet;

looking up a second-level table from said first and second address elements of said packet;

looking up and searching a third-level table, allowing a third level of search, from said third address element of said packet; and looking up and searching a fourth-level table from said fourth address element of said packet.

Thus, one embodiment of the invention makes it possible to advantageously combine a search in the first two tables with further searches in the other two tables. Said further searches are of linear or dichotomizing type and complete the processing. Said further searches (in said third-level and fourth-level tables) are carried out only when necessary. As a consequence, the size of the routing table—that is comprised of the four elementary tables defined above—is considerably reduced while ensuring a routing method with a high performance level.

In one embodiment, the first-level table comprises a first field determining whether search must end on the first level or must continue on a second level. A second field defines the output port of the router when the value of said first field defines a search having to end and, a third field returns an access pointer to the second-level table when the value of said first field defines a search having to go on.

Alternatively, the second and third fields are grouped in a single field that is differently interpreted according to the value of said first field.

Lookup of the second-level table is carried out by means of an input, computed from the value of the third field of said first-level table and corrected by a value read in an offset table comprising a single field returning a correction pointer to be added to the pointer returned by said third field of said first-level table.

The second-level table comprises a first, a second, a third, a fourth and a fifth field. The first field determines if search must end at the second level or if it must continue on a third level. The second field is compared with the second address element of the incoming packet to allow selection of the third or fourth field. The third field and fourth field define the output port when the value of the first field of the second-level table defines a search having to end or, define an access pointer to the third-level table when the value of said first field of the second-level table defines a search having to continue. Said fifth field defines an extent of search in the third-level table when the value of said first field of the second-level table defines a search having to continue.

The third-level table comprises:
a first field determining whether search must end at the third level or if it must continue on a fourth level;
a second field for comparison with the third byte of the address of said packet in order to allow selection of a third field or a fourth field, said third and fourth fields defining the output port when the value of the first field of the third-level table defines a search having to end or an access pointer to the fourth-level table when the value of said first field of the third-level table defines a search having to continue.

Lastly, the fourth-level table comprises:
a first field for comparison with the fourth byte of the address of said packet.
a second field defining an extent of search in said fourth-level table;
a third field defining a bit mask to be applied to the address of said packet when looking up said fourth-level table;
a fourth field defining which output port to use.

One embodiment of the invention also allows to realize a packet routing device in a telecommunications network comprising N output ports for processing packets comprising a destination address defined by at least a first, a second, a third and a fourth address element. The device comprises:
a first-level table accessed from said first address element of said packet;
a second-level table accessed from said first and second address elements of said packet;
a third-level table looked up from the third address element of said packet;
a fourth-level table looked up from the fourth address element of said packet.

BRIEF DESCRIPTION OF THE DRAWINGS

Other features of embodiments of the present invention will appear when reading the following description and in conjunction with the drawings, only given by way of nonrestrictive examples, where:

FIGS. 2A-2D illustrate the format used respectively for first-level table, second-level table, third-level table and fourth-level table, respectively, in accordance with an embodiment of the invention.

DETAILED DESCRIPTION OF THE INVENTION

Figure 1:
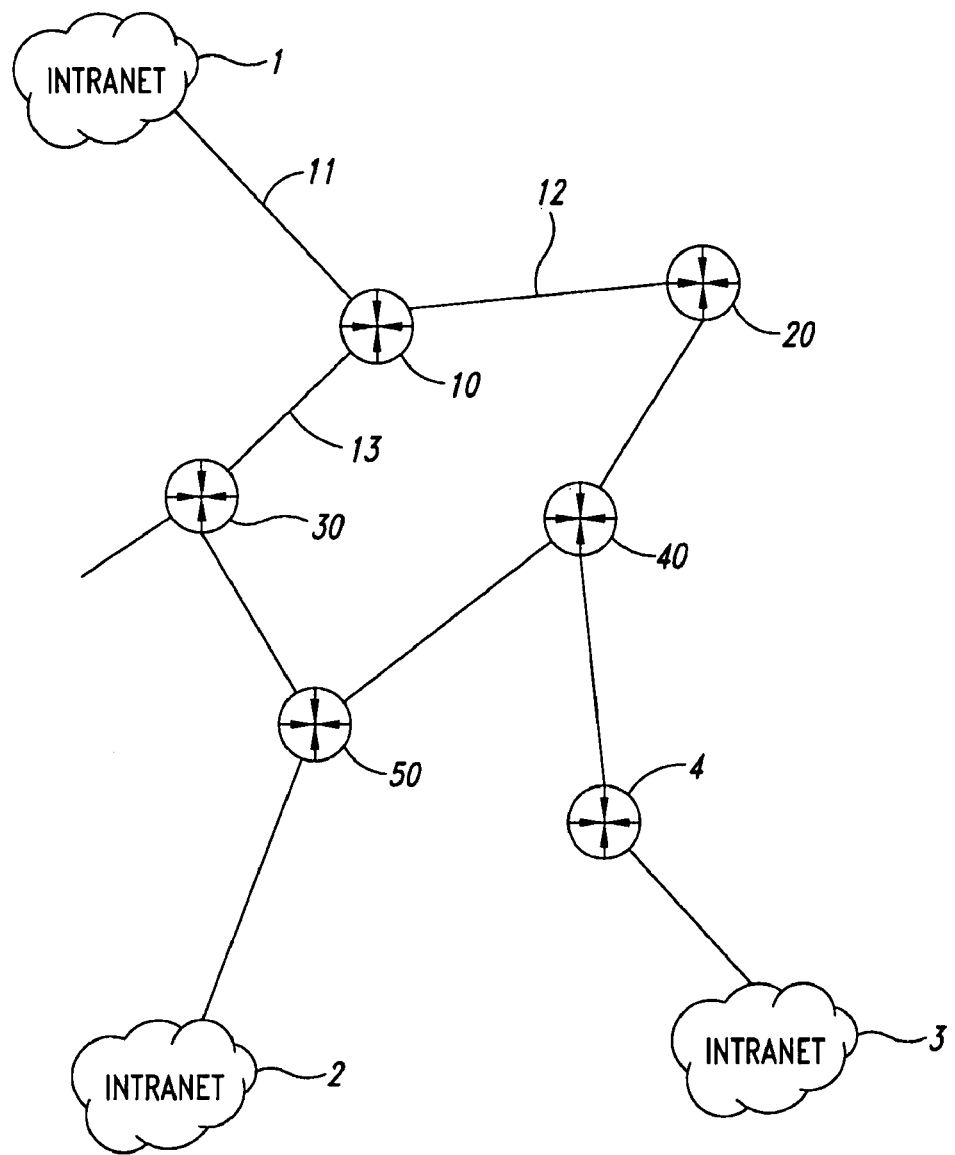
FIG. 1 illustrates the architecture of a telecommunications network comprising routers enabling communication between sub-networks.

Embodiments of a routing method for a telecommunications network and router for implementing said method are described herein. In the following description, numerous specific details are given to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Hereafter, the organization of a routing table and the table search and lookup method for determining the output port for an incoming packet comprising a destination address in conformity with the current protocol version in force on the Internet network, known as Ipv4, are more particularly described. As is known, in this protocol, IP addresses—for example A.B.C.D.—comprises four bytes that must be decoded to allow control of routing within each router according to the data contained in the router's local routing table. It is clear that this is only a particular embodiment, a particularly useful one.

In one embodiment, the organization of the routing table is designed to allow storage of about 10,000 inputs, which proves more than sufficient for the organization of an intranet. It should be observed that the implementation of such a great number of inputs can be carried out in a very simple way, by means of a table of reduced size that can be integrated in a semiconductor product.

FIG. 2 more particularly illustrates the organization of such a routing table that, as can be seen, is based on a set of four elementary tables—respectively a LEVEL_1 table, a LEVEL_2 table, a LEVEL_3 table and a LEVEL_4 table—said set allowing to control the routing method of an incoming packet, in combination with an offset table, in order to define the output port (Nexthop) towards which said packet must be routed.

The whole set of tables constitutes a data structure of reduced size compatible with the capacities of known RAM circuits. They make it possible to provide an output index, which index then defines one output port among N output ports.

A first-level table (LEVEL_1 table) illustrated in FIG. 2A has 256 inputs, so that each of the 256 inputs corresponds with a value of the first byte (A) of the IP address of the packet to be routed. For each input, a word comprising three fields, successively called VALID, INDEX NH and INDEX SECOND-LEVEL, is stored. In one embodiment, the size of these fields is set to 1 bit, 8 bits and 13 bits, respectively. Field VALID carries one information bit that will be decoded in the routing method explained below, indicating whether search must continue in successive tables. More especially, if field VALID is set to 0, then the routing method will end the search and will provide a pointer defining Nexthop for the input packet in the second field INDEX NH. The third field INDEX SECOND-LEVEL contains a value used as an access pointer to second-level table when the value of field VALID is equal to 1, as is explained in detail below.

The routing table further comprises a second-level table (LEVEL_2 table) as illustrated in FIG. 2B. The size of LEVEL_2 table is in general much greater than that of LEVEL_1 table. According to the particular router one wishes to realize, it usually contains several thousands of inputs. In particular it can be noted that this LEVEL_2 table can be advantageously dimensioned to allow comfortable maintenance thereof upon each new input. Space large enough for writing new consecutive inputs corresponding to new addresses should be provided for. For each input, said second-level table returns a word comprising a first field, VALID, a second field, COMBINATION, a third field, INDEX, a fourth field, INDEX2, and a fifth field, COUNT_LEVEL_3. Field VALID is used, as in first-level table previously, to determine in the routing method if search must end or if it is necessary to continue searching in LEVEL_3 table, as will be explained later. The second field COMBINATION carries a value that will be compared with the second byte of the IP address.

Fields INDEX and INDEX2 are set respectively to 17 and 8 bits, the first field being used as a pointer defining the packet output port when search can be considered finished in LEVEL_2 table, or as a pointer to LEVEL_3 table if search must go on. As will be seen in the description of the routing method, field INDEX is set to a value defining Nexthop of an input packet for any IP address whose second byte is between the current value of field COMBINATION and the value of the COMBINATION field of the next input to LEVEL_2 table. Field INDEX2 will return the output pointer of an incoming packet for any IP address whose second byte coincides with the value of field COMBINATION.

Lastly, field COUNT_LEVEL_3 contains a value—typically having 8 bits in one embodiment—which defines the extent of search—either linear or dichotomizing—that must be carried out in the routing method. Indeed, as will be seen in the description of the routing method, if the first two tables are directly accessed from the routing address of an input packet—thus ensuring fast processing thereof—the two tables of higher levels are subjected to a dichotomizing or linear search in order to significantly reduce the space required to store routing information.

The second-level table is associated with an offset table, the offset table comprising 65536 inputs for decoding the first two bytes of incoming packet IP address. This offset table is used to correct the pointed address of LEVEL_2 table, as will be seen in the following disclosure of the routing process.

The routing table further comprises, in addition to LEVEL_1 and LEVEL_2 tables, a third-level table (LEVEL_3 table) that is illustrated in FIG. 2C. For each input, LEVEL_3 table returns a word comprising a first field, VALID, a second field, COMBINATION, a third field, INDEX and a fourth field, INDEX2. Like previously for Level_1 table, the routing method uses field VALID to determine if search must end or if it is necessary to continue the search in a fourth-level table, as will be described below.

Finally a fourth-level table (LEVEL_4 table) completes the routing table architecture, as illustrated in FIG. 2D. LEVEL_4 table comprises, for each input corresponding to the four bytes of the IP address, a first field COMBINATION, a second field Nb defining the extent of the search in this fourth-level table, a field INDEX_MASK and a field INDEX_nh. The first field (COMBINATION) is compared with the fourth byte of the incoming packet address. The second field (NB) defines an extent of search in the fourth-level table and the third field (INDEX_MASK) defines a bit mask to be applied to the packet's address during this search. A fourth field (INDEX_NH) returns a pointer to the output port when search must end.

The routing method of a packet comprising a destination IP address will now be described, with reference to FIGS. 3, 4 and 5, said method being based on successive and advantageous use of information stored in the various aforementioned tables.

The method starts with step 301 in which the IP address of an incoming packet is read in order to extract a first information byte A therefrom.

In step 302, the method accesses LEVEL_1 table from the input defined by byte A, in order to read the contents of fields VALID, INDEX NH and INDEX LEVEL2.

In step 303, the value of field VALID is tested. If the value is equal to 0, then the method returns, in step 304, the value of field INDEX NH that defines, without ambiguity, Nexthop of the incoming packet. In this situation, routing is carried out in a minimum of time, and then the method can be completed at step 305.

On the other hand, if field VALID is equal to 1, it means that search must continue on a higher level in order to determine the output port of the packet. The method then proceeds to step 306 where the first two bytes A and B of the IP address are used to access the offset table that returns a value. Said value is added (step 307) to the contents of field INDEX LEVEL2 previously read in step 302. It should be noted that, in a particularly optimized embodiment, both fields INDEX NH and INDEX LEVEL2 of LEVEL_1 table can be grouped in a single field (for example, called INDEX) that will be interpreted differently according to the reading of bit VALID. If so desired, the size of LEVEL_1 table 1 could thus be further reduced. In the rest of this description, for clarity purpose, it will be assumed that two different fields INDEX NH and INDEX LEVEL2 coexist.

Then in step 308 the calculated value OFFSET+INDEX LEVEL2 is used to reach the second-level table, which table then returns the value of fields VALID, COMBINATION, INDEX, INDEX2 and COUNT_LEVEL_3 stored therein.

In step 309, field VALID corresponding to the input read in LEVEL_2 table is tested. If the value of this field is equal to 0, then the method continues with step 310 where the value of the second byte B of IP address is compared with the value contained in field COMBINATION, read at step 308. If both values are equal, then in step 311, the method returns the value of field INDEX2 to define Nexthop of the input packet and the method completes in step 312. If the value of byte B is different from the contents of field COMBINATION, then the method returns, step 313, the value of field INDEX, read at step 308, to define Nexthop and the method is completed in step 314.

On the other hand, if field VALID is equal to 1, it means search must still continue in LEVEL__3 table, at the input corresponding to the value stored in field INDEX, read in step 308.

In step 315, the second byte of the IP address is compared with the contents of field COMBINATION, read at step 308.

If values are different, the method continues with step 316 where the value of field INDEX2 is used to define the router's Nexthop. Then the method completes at step 317.

If the second byte of the IP address and the contents of field COMBINATION read at step 308 are equal, then the method proceeds to step 318 where LEVEL__3 table is accessed with the value of field INDEX.

Then, step 19, LEVEL__3 table is searched from the input defined by the value of field INDEX, search is carried on several consecutive inputs, the number of which is defined by the value stored in field COUNT_LEVEL__3 read in step 308. More precisely, among inputs COUNT_LEVEL__3, the method looks for the one having a field COMBINATION lower and closest to byte C of the packet's IP address. In one embodiment, search is linear but, alternatively, search could be dichotomizing. In this case, it would be advisable to make sure that inputs are stored in ascending order for all the address ranges defined by a dibit element A.B. In particular, it should be noted that dichotomizing search would be successful even if address ranges defined by a same value AB were to be suddenly moved. Thus, the method allows easy updating of routing tables by simply moving all of an address range towards a set of available positions in RAM.

Once an input is identified, step 320, fields VALID, COMBINATION, INDEX, INDEX2 are read in step 321. Then in step 322 the VALID field of same input is tested. If field VALID is equal to 0, then the method continues in step 323 where the value of the third byte C of the incoming packet's IP address is compared with the value contained in field COMBINATION of the input identified in step 321. If both values are equal, then the method defines the output port NH using the value contained in field INDEX2, step 324, and determination of the output port completes in step 325. If the value of byte C is different from the contents of field COMBINATION then, in step 326, the output port NH is defined by the value of the field INDEX of the input identified at step 321. Determination of the output port then completes at step 327.

On the other hand, if field VALID is equal to 1 in testing step 322, then the method continues with a step 328 similar to step 323, where the value of the third byte C of the incoming packet's IP address is compared with the value contained field COMBINATION of the input identified in step 321. If values are different, then in step 329, the process defines the output port NH from the value contained in field INDEX2 and completes in step 339.

If values are equal, then it means that search must still continue, step 330, in the fourth-level table, from the input corresponding to the value stored in field INDEX of the input identified in step 321.

In step 331, the method starts a search from the input defined by the value of field INDEX, which search is carried on several consecutive inputs, the number of which is defined by the value stored in field Nb of the input identified in step 321.

Among inputs Nb, the method looks for the one that has a field COMBINATION lower and closest to IP address byte D of the packet and, like previously, search can be linear or dichotomizing, step 332.

Then in step 333, a bit-serial logical AND operation is applied to the contents of field INDEX_MASK and the fourth byte D of the address of the packet to be routed.

In step 334 it is determined whether the result of step 333 is equal to the contents of field COMBINATION of the input identified in step 332.

If both values are equal, then the method reads the value of field INDEX2 in a first NEXT-HOP table, step 335. The method then completes in step 336.

If both values are not equal, then the method returns the default value of the output port, step 337, before completing in step 338.

Figure 3:
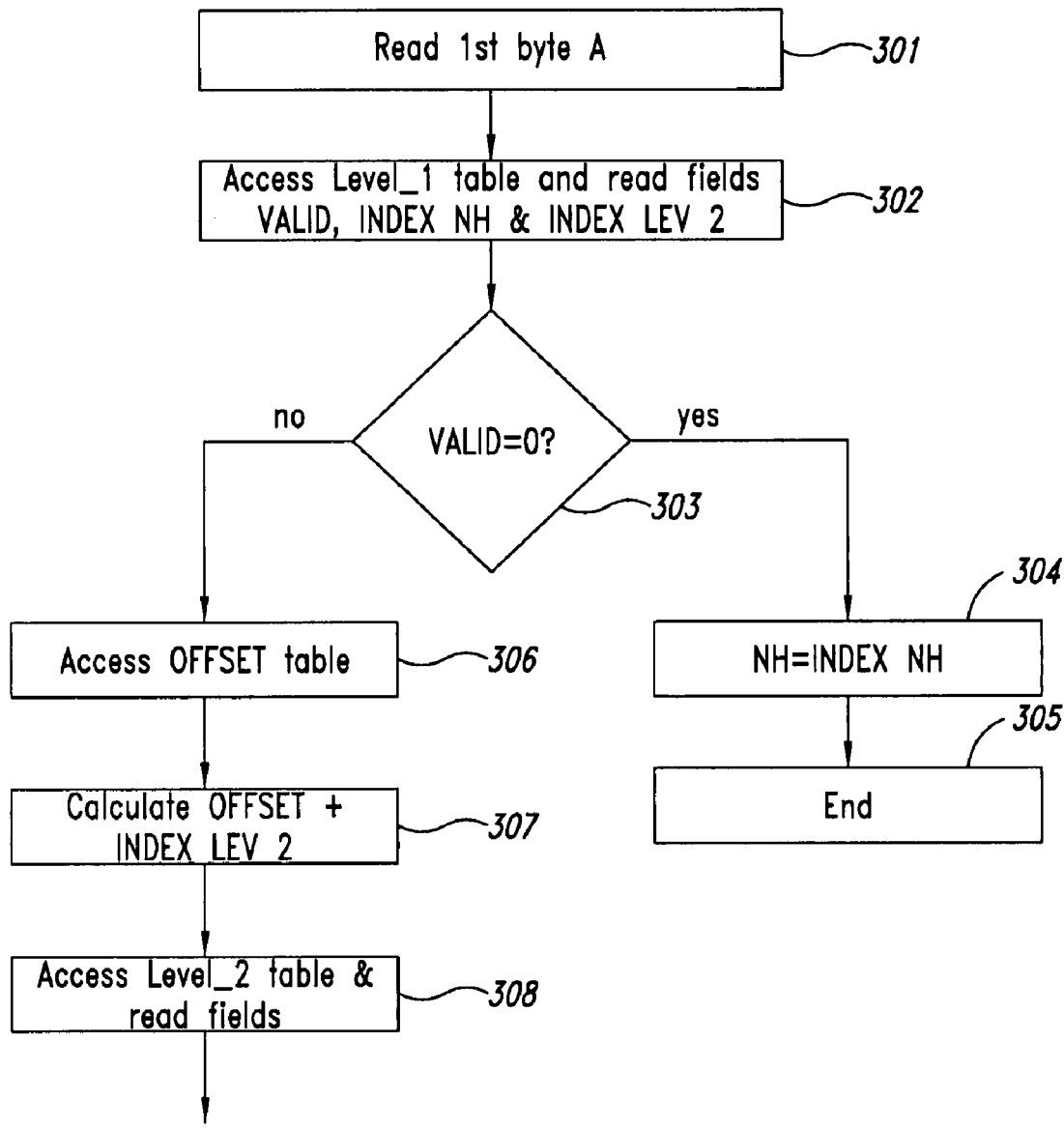
FIGS. 3, 4 and 5 illustrate the routing method according to an embodiment.
Figure 4:
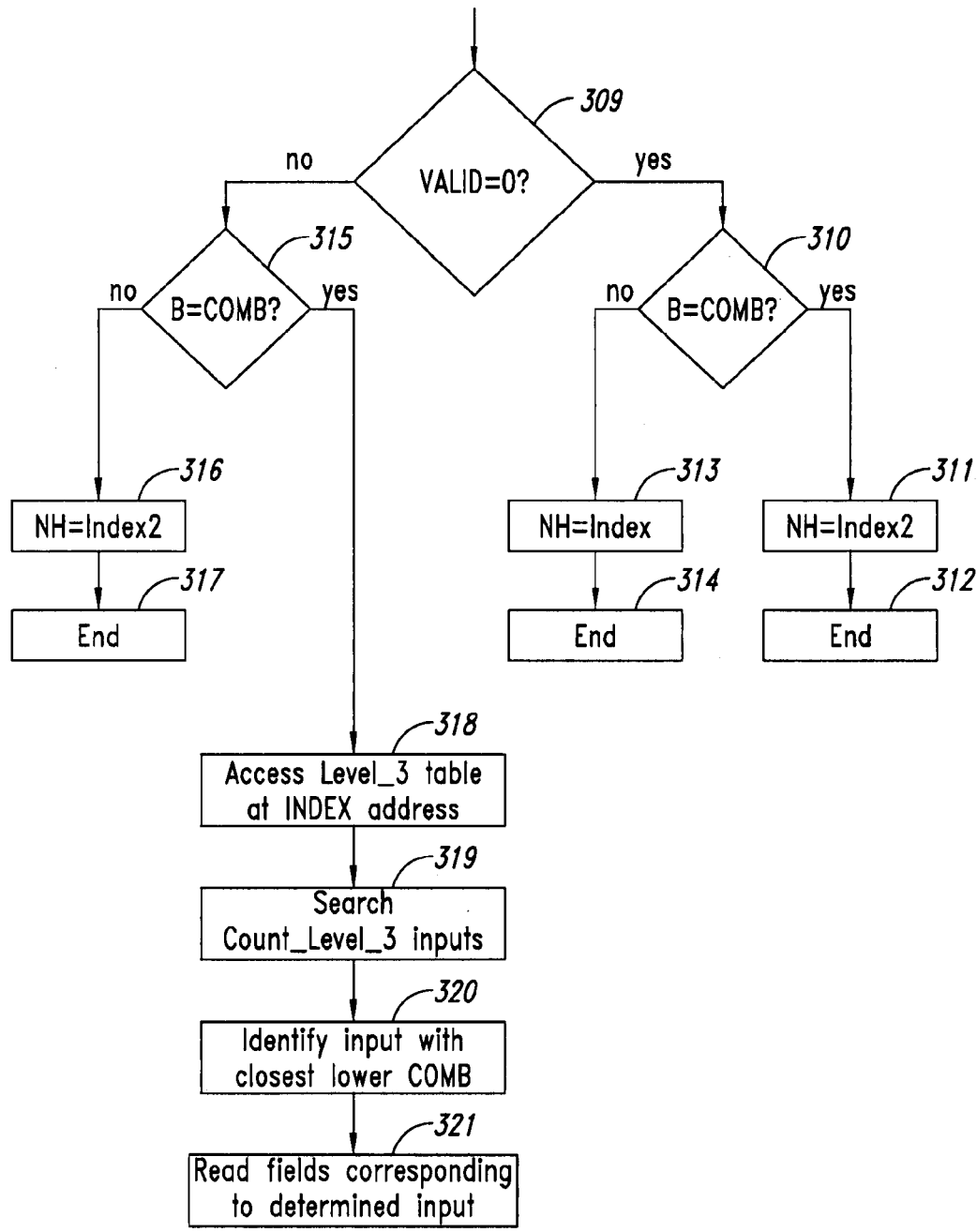
Figure 5:
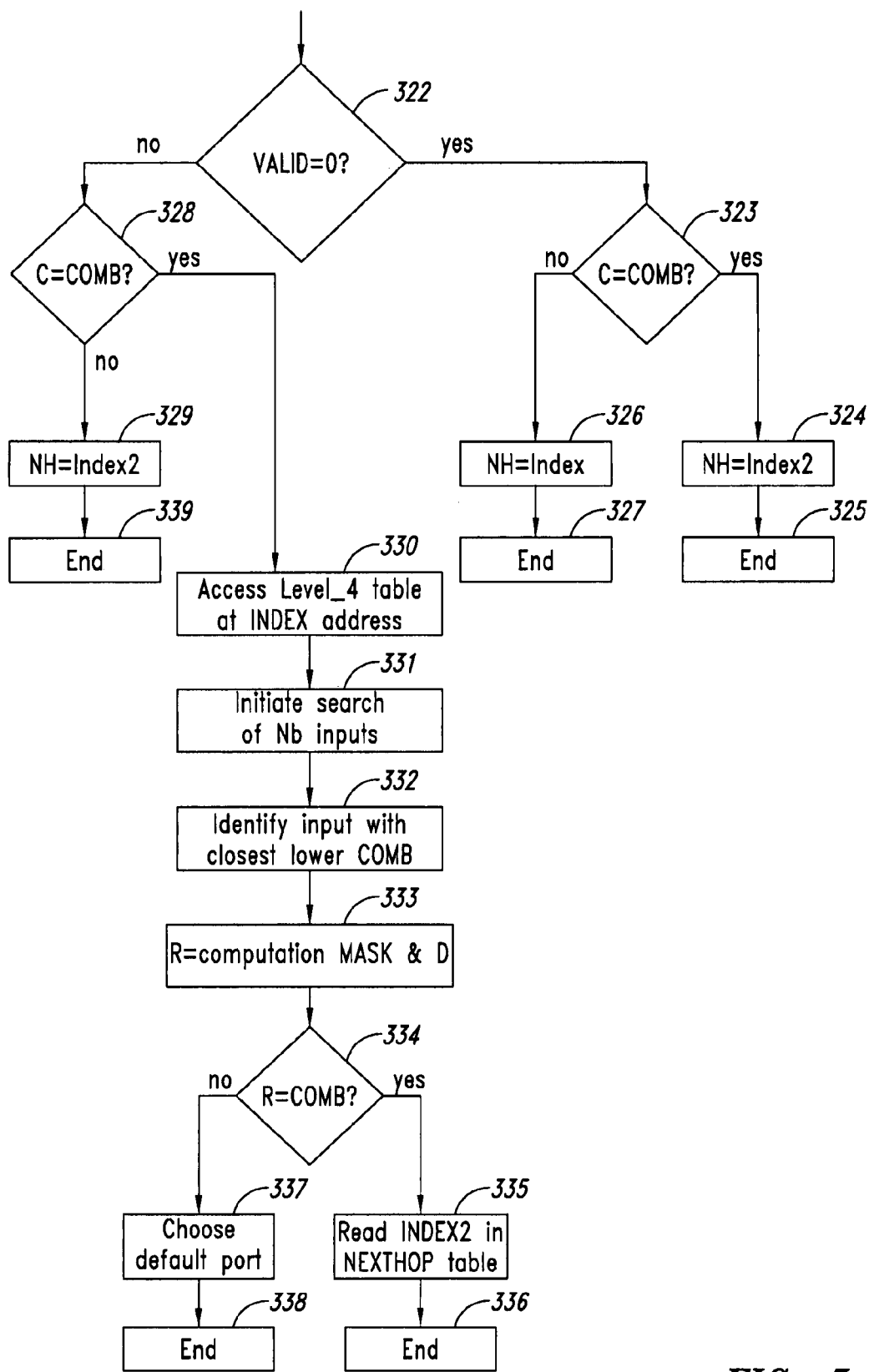

As can be seen, the method described in reference to FIGS. 3, 4 and 5 provides an output index that makes it possible to precisely define the output port of an input packet. In practical terms, an additional table (NEXTHOP table) can be associated with the four previously described tables, for storing reference indexes to ports of the considered router. The size of table NEXTHOP is judiciously selected according to the desired number of ports. Typically, when using a 64-port router, the first table will have 64 inputs. In one embodiment, the first input—or input 0—of this table is selected to point to the router's default port towards which packets that cannot be specifically routed towards another port according to their IP address, are systematically directed.

The mechanism that has just been described shows how to advantageously look up the previously discussed tables in order to quickly determine next-hop according to packet addresses. It should be noted that this table look-up mechanism can advantageously be combined with other mechanisms for charging information exchanged by routers in the contents of tables. Indeed, in the case of reception of a routing message defining assignment of a new address range to a given next-hop, corresponding to a <<database description>> message or <<link-state>> message for OSPF protocol for example, it could be convenient to provide the router with a specific process to update all previously described tables.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention and can be made without deviating from the spirit and scope of the invention.

These and other modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for routing information packets towards an output port of a telecommunication router having n output ports, said router receiving an incoming packet having a destination address defined by at least a first, a second, a third and a fourth address element, said method comprising:

looking up a first-level table from said first address element of said information packet;

looking up a second-level table from said first and second address elements of said packet;

looking up and searching a third-level table, allowing a third level of search, from said third address element of said packet;

looking up and searching a fourth-level table from said fourth address element of said packet; and routing said packet using a result of at least one of said look ups, wherein the first-level table includes:

a first field determining whether a search must end on a first level or continue on a second level;

a second field defining an output port of the router if a value of said first field defines the search having to end; and a third field returning an access pointer to the second-level table if the value of said first field defines the search having to continue.

2. The method according to claim 1 wherein said second and third fields are grouped in a single field interpreted differently according to the value of said first field.

3. The method according to claim 1 wherein lookup of the second-level table is carried out by using an input computed from a value of the third field of said first-level table, corrected by a value read in an offset table having a single field.

4. The method according to claim 3 wherein the second-level table includes a first, a second, a third, a fourth and fifth fields:

said first field determining whether search must end on the second level or continue on a third level;

said second field being compared with the second address element of said packet in order to allow selection of said third field or fourth field;

said third and fourth fields defining an output port if a value of the first field of the second-level table defines a search having to end or an access pointer to the third-level table if the value of said first field of the second-level table defines a search having to continue; and said fifth field defining an extent of search in said third-level table if the value of said first field of the second-level table defines a search having to continue.

5. The method according to claim 4 wherein said third-level table includes a first, a second, a third and a fourth field:

said first field determining whether search must end on the third level or continue on a fourth level;

said second field being used for comparison with the third address element of said packet in order to allow selection of said third or fourth fields; and said third field and fourth field defining the output port if a value of the first field of the third-level table defines a search having to end or an access pointer to the fourth-level table if the value of said first field of the third-level table defines a search having to continue.

6. The method according to claim 4 wherein said fourth-level table includes:

a first field for comparison with the fourth address element of said packet, a second field defining an extent of search in said fourth-level table;

a third field defining a bit mask to apply to the address of said packet during search of said fourth-level table; and a fourth field defining which output port to use.

7. The method according to claim 1 wherein search in said third-level table and said fourth-level table is either linear or dichotomizing.

8. The method of claim 1 wherein said incoming packet having said destination address defined by at least said fourth address element is received by said router from a telecommunication network.

9. A device to route an information packet, said packet having a destination address defined by at least a first, a second, a third and a fourth address element, said device comprising:

a first-level table accessible from said first address element of said packet;

a second-level table accessible from said first and second address elements of said packet;

a third-level table searchable from the third address element of said packet;

a fourth-level table searchable from the fourth address element of said packet; and an output port from among n output ports, said packet being routable to said output port using a result of a search of at least one of said table, wherein the first-level table includes:

a first field usable to determine whether a search must end on the first level or continue on a second level;

a second field to define said output port if a value of said first field defines the search having to end; and a third field to return an access pointer to the second-level table if the value of said first field defines the search having to continue.

10. The device according to claim 9, further comprising an additional offset table to return an offset value that is added to a value of said third field of the first-level table in order to access the second-level table.

11. The device according to claim 10 wherein the second-level table includes a first, a second, a third, a fourth and fifth field:

said first field being usable to determine whether search must end on the second level or continue on a third level;

said second field being adapted to be compared to the second address element of said packet to allow selection of said third field or fourth field;

said third field and fourth field being adapted to define an output port if a value of the first field of the second-level table defines a search having to end or an access pointer to the third-level table if the value of said first field of the second-level table defines a search having to continue; and said fifth field being adapted to define an extent of search in said third-level table if the value of said first field of the second-level table defines a search having to continue.

12. The device according to claim 11 wherein said third-level table includes a first, a second, a third, and a fourth field:

said first field being usable to determine whether search must end on the third level or continue on a fourth level;

said second field being adapted to be compared with the third byte of the address of said packet in order to allow selection of said third field or fourth field; and said third field and fourth field being adapted to define an output port if a value of the first field of the third-level table defines a search having to end or an access pointer to the fourth-level table if the value of said first field of the third-level table defines a search having to continue.

13. The device according to claim 12 wherein said fourth-level table includes:

a first field being adapted to be compared with the fourth address element of said packet;

a second field to define an extent of search in said fourth-level table;
a third field to define a bit mask to apply to the address of said packet during search of said fourth-level table; and
a fourth field to define which output port to use.

14. The device of claim 9 wherein said first-level, second-level, third-level, and fourth-level tables are integrated in a semiconductor product.

15. The device of claim 9 wherein said first-level, second-level, third-level, and fourth-level tables are stored in a memory.

16. A device for routing an information packet, the packet having a destination address that includes first, second, third, and fourth address elements, the device comprising:
a means for determining where to route said packet, wherein said means for determining performs:
a reading of a first-level table based the first address element of the information packet;
a reading of a second-level table based on the first and second address elements of the packet;
a reading and searching of a third-level table, if needed, based on the third address element of the packet; and
a reading and searching of a fourth-level table, if needed, based on the fourth address element of the packet; and
an output port means among a plurality of output port means, said packet being routable to said output port means by said means for determining, using a result obtained by at least one of said readings,
wherein the first-level table includes:
a first field means for determining whether searching must end on a first level at the first-level table or continue on a second level at the second-level table;
a second field means for defining said output port means if a value of the first field means determines searching having to end; and
a third field means for returning an access pointer to the second-level table if the value of the first field means defines searching having to continue.

17. The device of claim 16 wherein the second-level table includes:
a first field means of the second table for determining whether searching must end on the second level at the second-level table or continue on a third level at the third-level table;
a second field means of the second-level table for comparing with the second address element of the packet to allow selection of the third or fourth field means of the second-level table;
third and fourth field means of the second-level table for defining said output port means if a value of the first field means of the second-level table defines searching having to end or an access pointer to the third-level table if the value of the first field means of the second-level table defines searching having to continue; and
a fifth field means of the second-level table for defining an extent of searching in the third-level table if the value of the first field means of the second-level table defines searching having to continue;
wherein the third-level table includes:
a first field means of the third-level table for determining whether searching must end on the third level or continue on a fourth level at the fourth-level table;
a second field means of the third-level table for comparing with the third address element of the packet to allow selection of the third or fourth field means of the third-level table; and
third field and fourth field means of the third-level table for defining said output port means if a value of the first field means of the third-level table defines searching having to end or an access pointer to the fourth-level table if the value of the first field of the third-level table defines a search having to continue;
wherein the fourth-level table includes:
a first field means for comparing with the fourth address element of the packet;
a second field means for defining an extent of searching in the fourth-level table;
a third field means for defining a bit mask to apply to the address of the packet during searching of the fourth-level table; and
a fourth field means for defining which of said plurality of output port means to use.

18. The device of claim 16, further comprising semiconductor product means for storing said first-level, second-level, third-level, and fourth-level tables.

19. The device of claim 16, further comprising an offset table to return an offset value that is added to a value of said third field means of the first-level table in order to access the second-level table.

20. A system to route an information packet, the packet having a destination address including at least first, second, third, and fourth address elements, the system comprising:
a network component having a plurality of output ports, the packet being routable to at least one of the output ports of the network component;
a first-level table accessible based on the first address element of the packet to determine which output port of the network component to use to route the packet;
a second-level table accessible, if needed, based on the first and second address elements of the packet to determine which output port of the network component to use to route the packet;
a third-level table searchable, if needed, based on the third address element of the packet to determine which output port of the network component to use to route the packet; and
a fourth-level table searchable, if needed, based on the fourth address element of the packet to determine which output port of the network component to use to route the packet,
wherein said network component is adapted to route said packet to said determined output port using a result of at least one search of said tables, and
wherein at least some of the tables include a plurality of fields, a first one of the fields having a value indicative of whether a search is to end or to continue to a subsequent table, a second one of the fields having a value of an output port to use if the first one of the fields have the value indicative that the search is to end.

21. The system of claim 20 wherein the network component includes a router.

22. The system of claim 20 wherein said first-level, second-level, third-level, and fourth-level tables are integrated in a semiconductor product included in said network component.

23. The system of claim 20 wherein said first-level, second-level, third-level, and fourth-level tables are stored in a memory included in said network component.

24. The system of claim 20 wherein the first-level table includes:
a first field usable to determine whether a search must end on the first level or continue on a second level;

a second field to define said determined output port of the network component if a value of said first field defines the search having to end; and a third field to return an access pointer to the second-level table if the value of said first field defines the search having to continue, the system further including:

an offset table to return an offset value that is added to a value of said third field of the first-level table in order to access the second-level table.

* * * * *

UNITED STATES PATENT AND TRADEMARK OFFICE
CERTIFICATE OF CORRECTION

| | | |
|---|---|---|
| PATENT NO. | : 7,570,644 B2 | Page 1 of 1 |
| APPLICATION NO. | : 10/417629 | |
| DATED | : August 4, 2009 | |
| INVENTOR(S) | : Matthias Dietrich | |

It is certified that error appears in the above-identified patent and that said Letters Patent is hereby corrected as shown below:

Title Page, Item 56

References cited, the following reference should be corrected as shown below:

U.S. PATENT DOCUMENTS
"6,061,701 A   5/2000   Hirai et al.....................709/202" should read as --6,061,712 A   5/2000   Tzeng....................709/202--

Signed and Sealed this

Thirteenth Day of April, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,570,644 B2 |
| APPLICATION NO. | : 10/417629 |
| DATED | : August 4, 2009 |
| INVENTOR(S) | : Matthias Dietrich |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1401 days.

Signed and Sealed this

Seventh Day of September, 2010

David J. Kappos
*Director of the United States Patent and Trademark Office*